US009675921B2

(12) United States Patent
Bahnen et al.

(10) Patent No.: US 9,675,921 B2
(45) Date of Patent: Jun. 13, 2017

(54) AIR FILTER ATTACHMENT FOR SIDE CHANNEL COMPRESSOR

(75) Inventors: Rudolf Bahnen, Roetgen (DE); Ulli Kriebel, Solingen (DE); Lars Buchholz, Wetter (DE); Henryk Waniek, Solingen (DE); Achim Von Kathen, Wuppertal (DE)

(73) Assignee: Gebr. Becker GmbH, Wuppertal (DE)

( * ) Notice: Subject to any disclaimer, the term of this patent is extended or adjusted under 35 U.S.C. 154(b) by 547 days.

(21) Appl. No.: 14/236,390

(22) PCT Filed: Jul. 11, 2012

(86) PCT No.: PCT/EP2012/063576
§ 371 (c)(1),
(2), (4) Date: Feb. 18, 2014

(87) PCT Pub. No.: WO2013/017383
PCT Pub. Date: Feb. 7, 2013

(65) Prior Publication Data
US 2014/0169939 A1     Jun. 19, 2014

(30) Foreign Application Priority Data

Aug. 3, 2011  (DE) .................. 10 2011 052 379
Feb. 15, 2012  (DE) .................. 10 2012 101 185

(51) Int. Cl.
*F04D 29/70*     (2006.01)
*B01D 46/52*     (2006.01)
(Continued)

(52) U.S. Cl.
CPC ....... *B01D 46/521* (2013.01); *B01D 46/0005* (2013.01); *B01D 46/2407* (2013.01); *F04D 23/008* (2013.01); *F04D 29/701* (2013.01)

(58) Field of Classification Search
CPC . F04D 23/008; F04D 29/701; B01D 46/0005; B01D 46/2407; B01D 46/521
See application file for complete search history.

(56) References Cited

U.S. PATENT DOCUMENTS 5,049,770 A * 9/1991 Gaeth .................. F02B 63/06
310/43
5,527,149 A * 6/1996 Moss .................... F04D 23/008
415/55.1

(Continued)

FOREIGN PATENT DOCUMENTS

DE    40 29 041 A1    4/1991
DE    41 09 548 A1    10/1991
(Continued)

OTHER PUBLICATIONS

International Search Report of PCT/EP2012/063576, mailed Dec. 7, 2012.
(Continued)

*Primary Examiner* — Woody Lee, Jr.
(74) *Attorney, Agent, or Firm* — Collard & Roe, P.C.

(57) ABSTRACT

The invention first relates to an air filter attachment (4) for a turbomachine, in particular a side channel compressor, comprising a housing, comprising a filter material (8) arranged in a housing interior, and comprising an inlet (9) and an outlet (10) which are formed in the housing, which have a free opening cross section, and through which air is suctioned. The aim of the invention is to advantageously design a turbomachine comprising an air filter attachment. This is achieved in that the housing interior that has the filter material (8) extends laterally relative to the opening cross section of the inlet (9) and/or the outlet (10) in a non-uniform manner and in any case in a direction by a magnitude of 1½ or more times the dimension from a central axis (M) of the respective opening cross section to a periphery of
(Continued)

Figure 1:
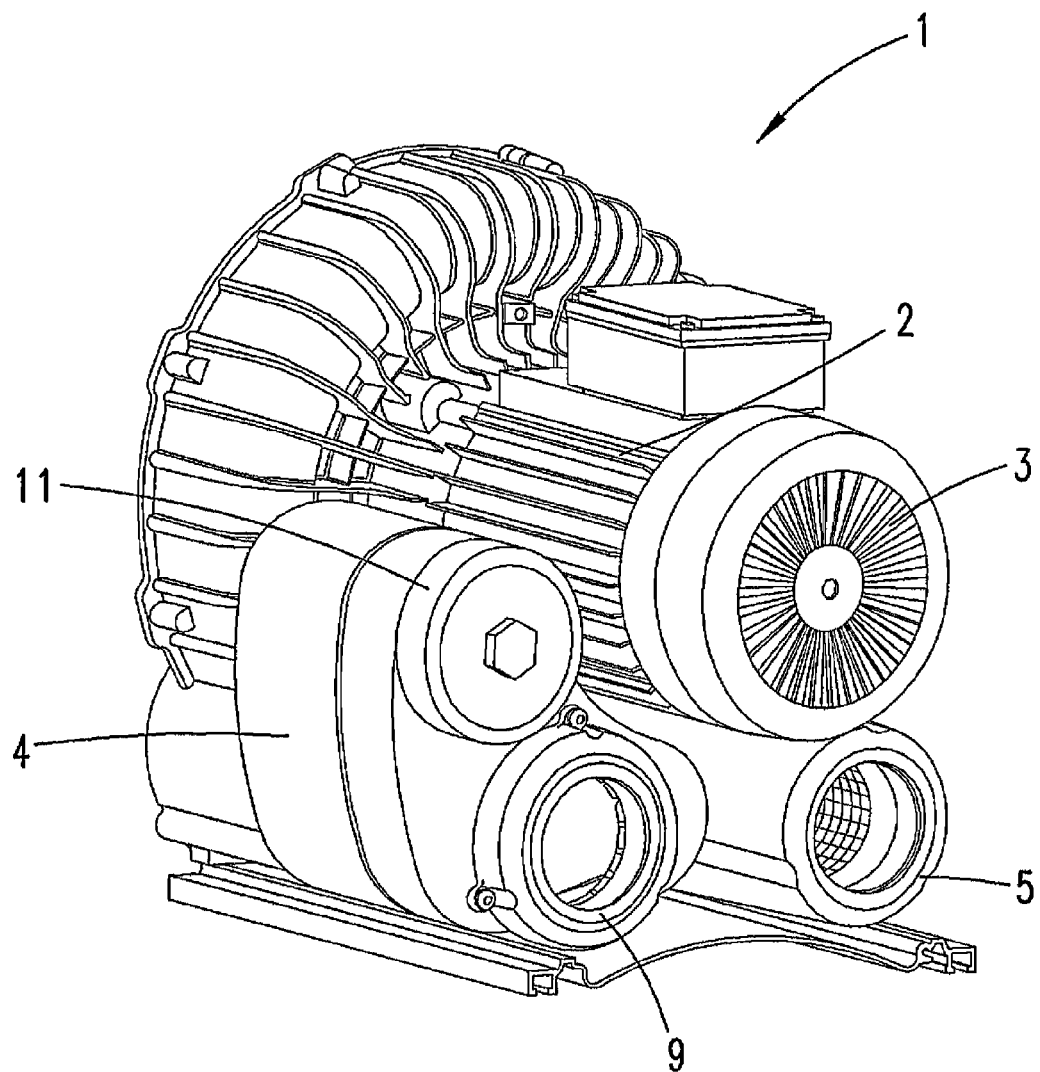

the opening cross section in the direction. The invention further relates to a turbomachine, in particular a side channel compressor, comprising such an air filter attachment. Additionally, the invention relates to a filter part (12, 19) consisting of a pleated filter material (8) or a circumferential filter wall (21) which is connected to a base part (22) and which consists of a filter material.

5 Claims, 16 Drawing Sheets

(51) Int. Cl.
  *F04D 23/00* (2006.01)
  *B01D 46/24* (2006.01)
  *B01D 46/00* (2006.01)

(56) References Cited

U.S. PATENT DOCUMENTS

| | | | | |
|---|---|---|---|---|
| 5,603,601 | A | * | 2/1997 | Winkelstroter ....... F04D 23/008 137/271 |
| 5,876,599 | A | * | 3/1999 | Sylvester ............... B01D 29/21 210/232 |
| 2006/0032201 | A1 | * | 2/2006 | Kisakibaru ........ B01D 46/0013 55/498 |
| 2006/0070364 | A1 | * | 4/2006 | Reamsnyder ...... B01D 46/0001 55/484 |
| 2006/0185334 | A1 | * | 8/2006 | Taketomi ............. B01D 46/002 55/490 |

FOREIGN PATENT DOCUMENTS

| | | |
|---|---|---|
| DE | 43 41 266 C1 | 7/1994 |
| EP | 0 656 480 A1 | 11/1994 |
| EP | 1 473 522 A1 | 11/2004 |
| EP | 1 634 634 A1 | 3/2006 |
| GB | 2 289 918 A | 12/1995 |
| WO | 01/87456 A2 | 11/2001 |
| WO | 2008/082065 A1 | 7/2008 |
| WO | 2008/125630 A1 | 10/2008 |
| WO | 2009/106593 A1 | 9/2009 |

OTHER PUBLICATIONS

English Translation of International Preliminary Report on Patentability of PCT/EP2012/063576, Feb. 3, 2014.

* cited by examiner

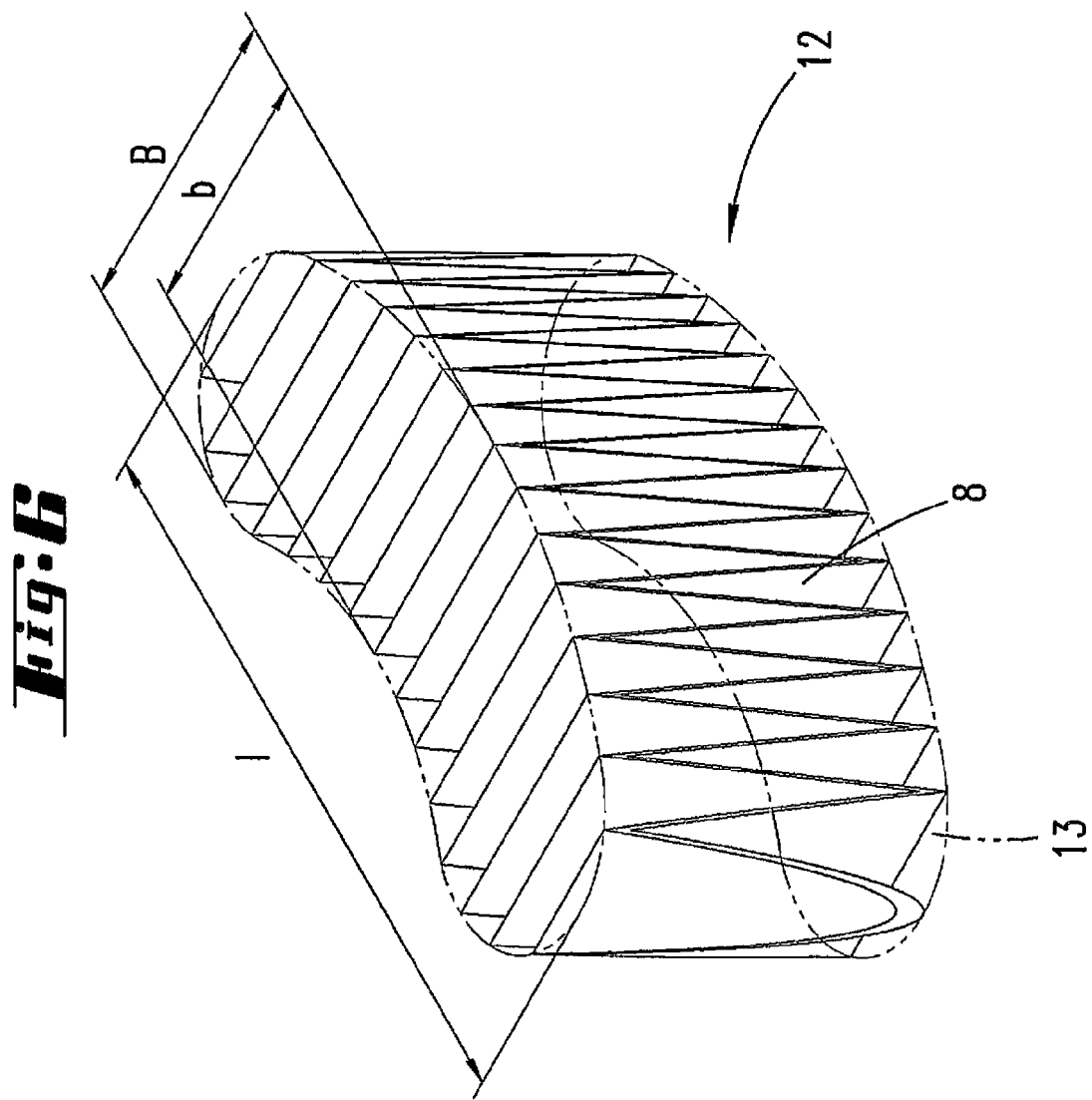

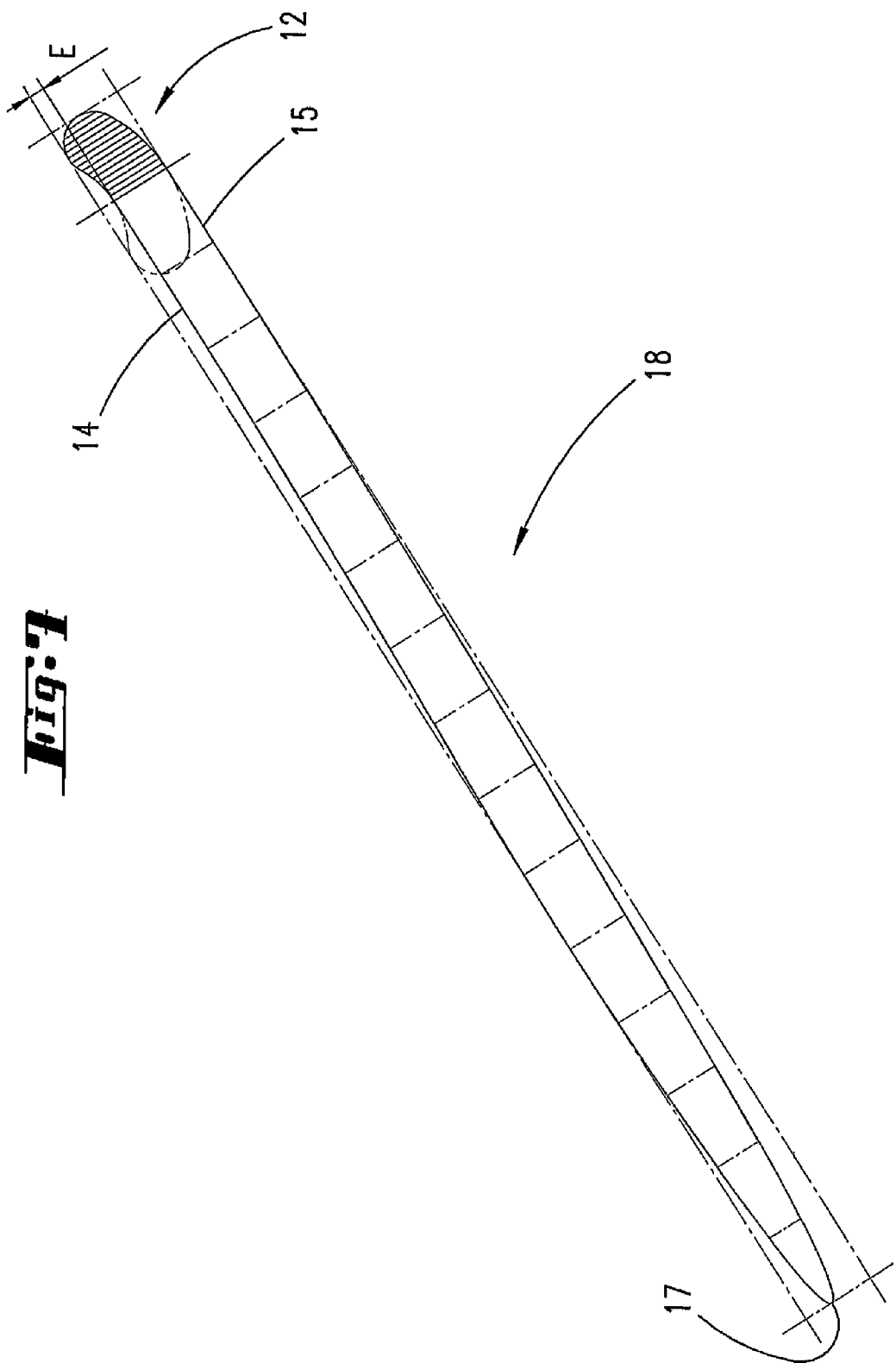

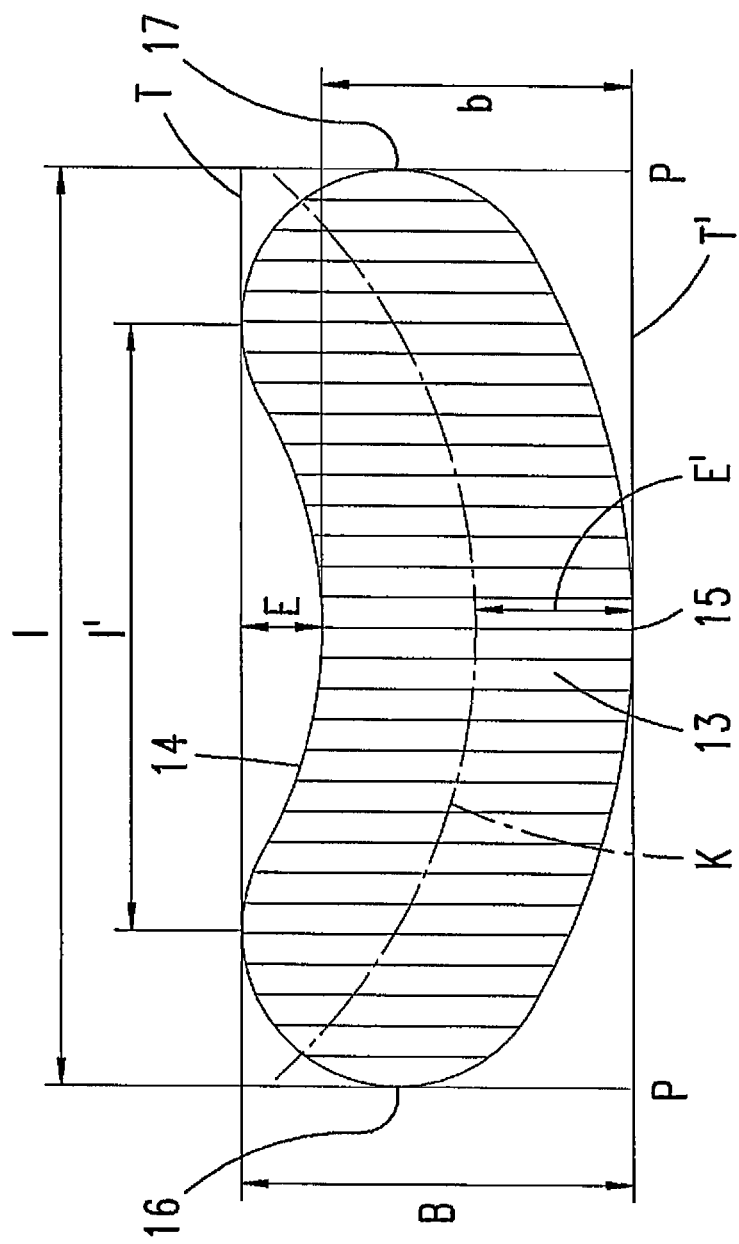

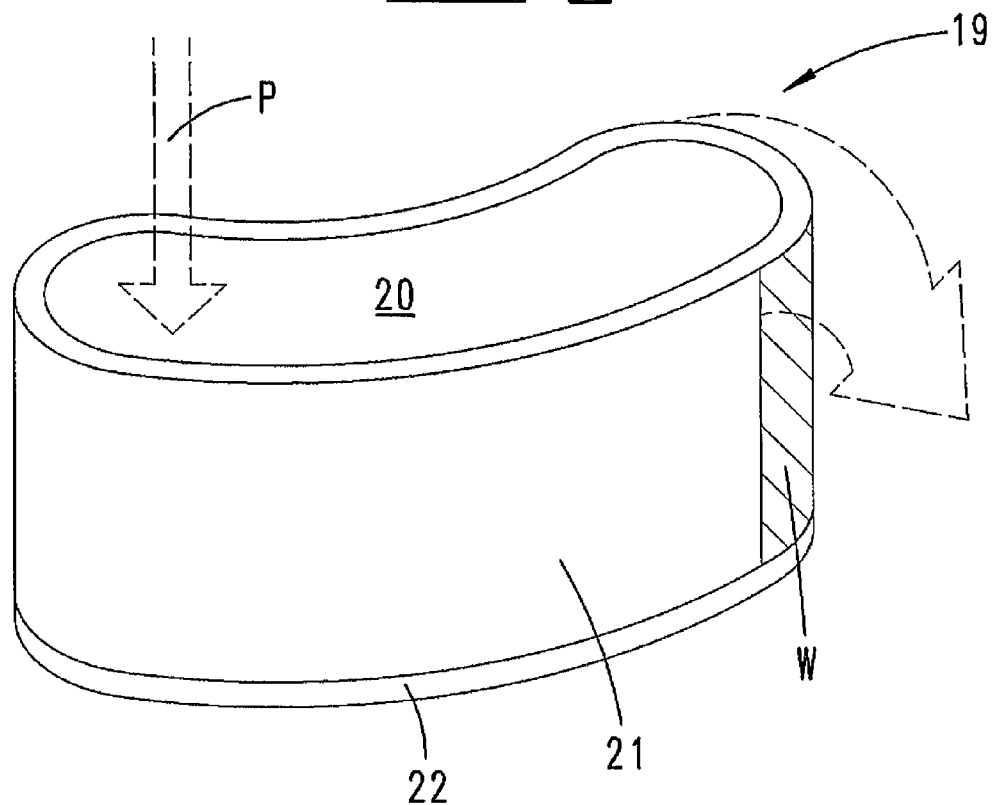
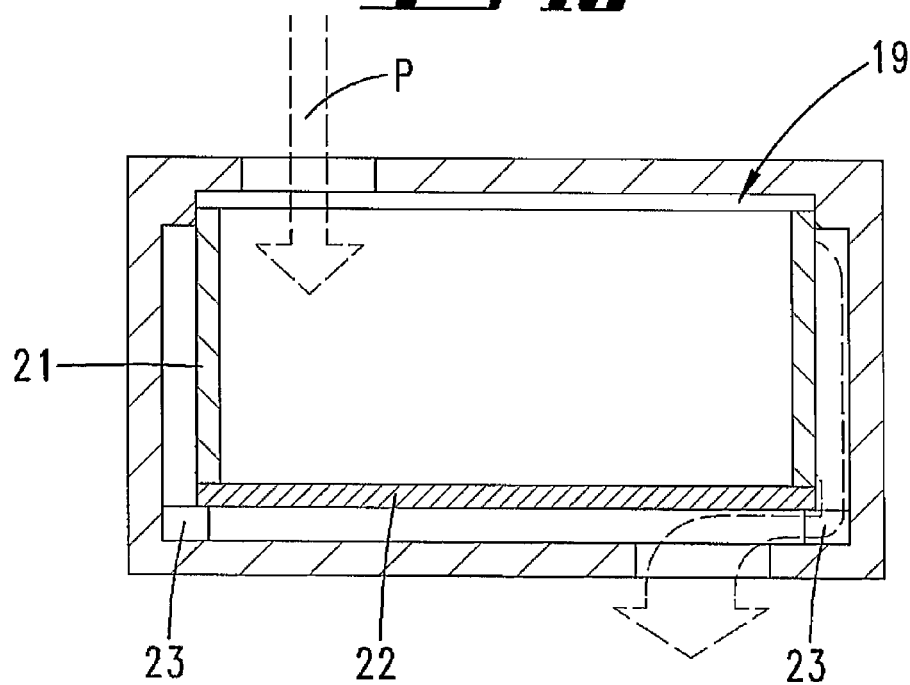

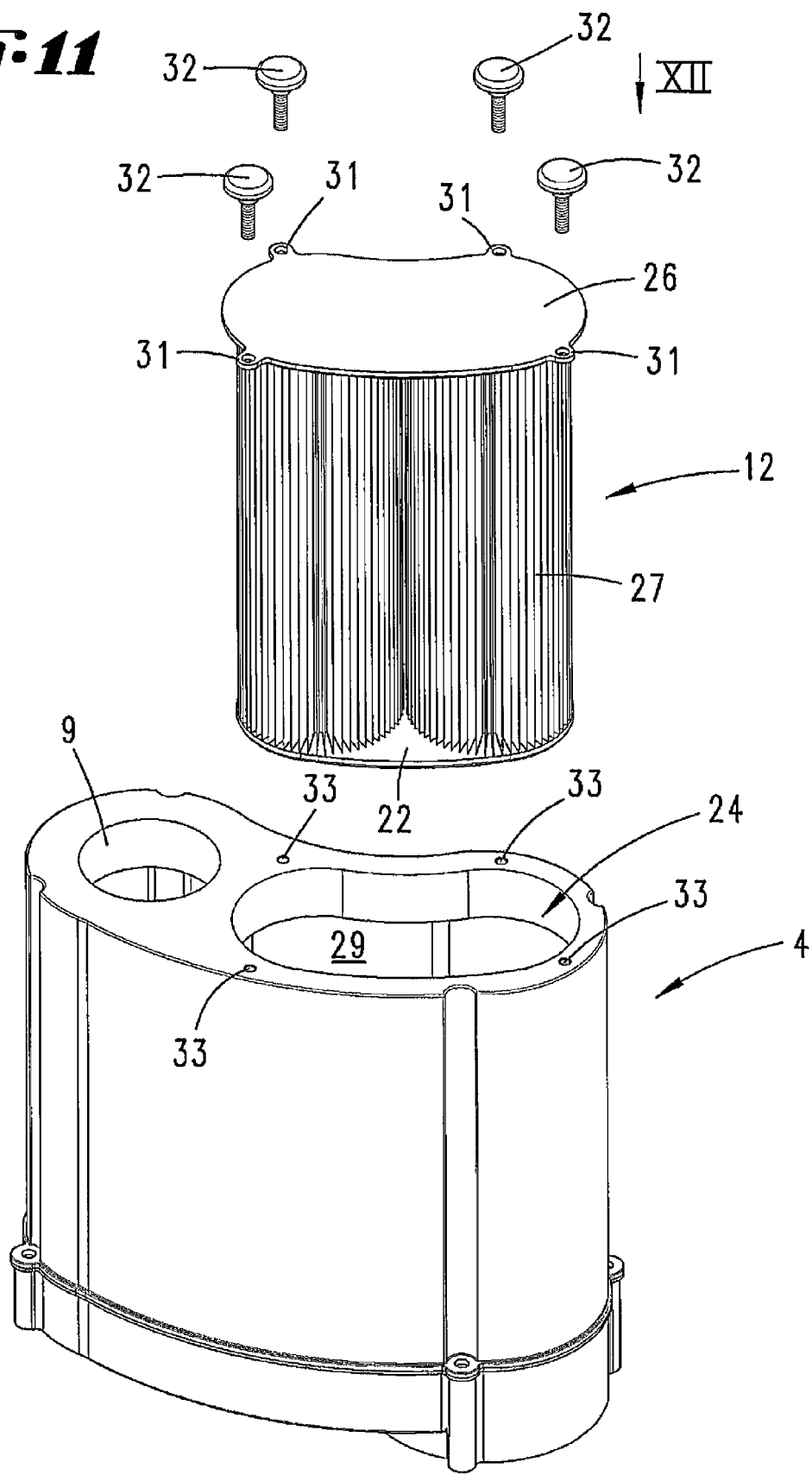

AIR FILTER ATTACHMENT FOR SIDE CHANNEL COMPRESSOR

CROSS REFERENCE TO RELATED APPLICATIONS

This application is the National Stage of PCT/EP2012/063576 filed on Jul. 11, 2012, which claims priority under 35 U.S.C. §119 of German Application Nos. 10 2011 052 379.0 filed on Aug. 3, 2011, and 10 2012 101 185.0 filed on Feb. 15, 2012, the disclosures of which are incorporated by reference. The international application under PCT article 21(2) was not published in English.

The invention relates first of all to a dynamic-type compressor having an air filter attachment, in particular configured as a side channel compressor, the air filter attachment having a housing and a filter material which is arranged in a housing inner space and is composed, for example, of a nonwoven material, an inlet and an outlet being formed, moreover, in the housing.

Furthermore, the invention relates to an air filter attachment for a dynamic-type compressor, in particular a side channel compressor, having a housing and a filter medium which is arranged in a housing inner space and is composed, for example, of a nonwoven material, having an inlet and outlet which are formed in the housing and have a free opening cross section for air which is sucked through.

Air filter attachments of this type have already been disclosed in a variety of respects, in particular also in conjunction with side channel compressors, for dynamic-type compressors. Reference is made, for example, to EP 656 480 A1 and WO 2008/125630 A1.

Furthermore, the invention relates to a filter part consisting of a pleated filter material or a circumferential filter wall which is composed of filter material and is connected to a bottom part, in each case having an inner clearance, the inner clearance being flow-connected to an outlet opening and the medium to be filtered flowing through the filter material into the clearance and finally through the outlet opening.

Proceeding from the cited prior art, the invention is concerned in one respect with the object which is set of advantageously configuring a dynamic-type compressor with an air filter attachment. In a further respect, the invention is concerned with the object which is set of specifying an air filter attachment for a dynamic-type compressor, in particular a side channel compressor, which air filter attachment makes a comparatively large filter volume possible. In a further respect, the invention is concerned with the object which is set of specifying a filter part which makes favorable filtering possible.

One possible achievement of the object is given according to a first concept of the invention in a dynamic-type compressor, in which the aim is that the housing is arranged in plan view at least partially within an outer contour of the side channel compressor, in relation to a projection of the compressor outer contour (fan outer contour) in the direction of a rotational axis of the compressor fan, and has a non-circular design.

By virtue of the fact that the air filter attachment, at least in relation to a wall which encloses the filter part directly, has a non-circular outline design, it can be arranged so as to extend in the circumferential direction of the compressor outer contour. It is therefore preferably also of elongate configuration. Despite a considerable size, in particular in its direction of extent, it can be arranged at least partially within the outer contour of the compressor. This is effected preferably with an inflow direction which is identically directed with respect to the direction of the rotational axis of the compressor fan.

One possible achievement of the object is also given in an air filter attachment, in which the housing inner space which has the filter material extends laterally with respect to the opening cross section of the inlet or the outlet in an inhomogeneous manner and at any rate in one direction by an enlarging dimension which corresponds to times or more of the dimension from a center axis of the respective opening cross section as far as a boundary of the opening cross section in said direction. To this extent, the invention proposes an air filter, with an in relation to a flow path which, in relation to a perpendicular projection at any rate of the inlet, requires or at least makes possible an air throughflow which differs from said projection. The enlargement which exists at any rate in one direction can first of all signify an arrangement also of filter material in a region which does not lie in the (initially) most favorable path in terms of pressure between the inlet and the outlet, which path is taken by the air which is sucked through. However, it has been recognized that this filter material also comes into action, namely when the filter material on the direct path between the inlet and the outlet becomes increasingly clogged and the air correspondingly seeks a longer path which is associated, however, with a pressure loss which is (then) lower.

To this end, it is also beneficial if, at least as viewed from the inlet, there is a certain clearance at least as far as the beginning of the filter material in the flow direction, which clearance also extends as far as possible over the entire filter area which extends, in particular, in the direction of the enlarging dimension. The deflection of the throughflow can then increasingly take place freely via said clearance.

The specified design makes it possible to configure air filters in combination with a dynamic-type compressor, such as, in particular, a side channel compressor, the housing of which is formed so as to differ from the usual cylindrical shape and can be adapted correspondingly to the given spatial conditions.

In particular, a housing of this type, as viewed in the projection of a rotational axis of the fan of, for example, a side channel compressor, can have an outline which is in the shape of a circular segment, is kidney-shaped or is oval. Here, the inlet and outlet can be assigned to the ends of the circular segment section, the ends of the kidney shape or also the ends of the oval.

It is preferred, in particular, that the free opening cross sections of the inlet and the outlet coincide in the perpendicular projection or at any rate overlap and together result in an, optionally imaginary, overall cross section, the housing inner space which has the filter material extending, furthermore, laterally with respect to the overall cross section at any rate in one direction by said enlarging dimension which corresponds from a center axis of one of the opening cross sections, optionally of the opening cross section which to this extent produces part of the overall cross section, as far as the boundary of the overall cross section in said direction. To this extent, in the case of an air filter of this type, this also results in an asymmetrical housing configuration in relation to the direct flow path between the inlet and the outlet, or at any rate in a housing configuration which is enlarged greatly in comparison with said overall cross section. To this extent, this also initially leads to filter material which lies outside said overall cross section not being flowed through, or being flowed through to a much lesser extent, by the air which flows through. This circumstance can also be accepted here, since, during clogging of the filter material, the throughflow of the cross section of the filter material which was initially flowed through to a lesser extent naturally also likewise results, also on account of a pressure drop which is displaced by this over the cross section.

Furthermore, with regard to the addressed designs of the air filter, the structural option results to also provide a further construction element in the air filter, as will be described in greater detail further below, in addition to the inlet and in a juxtaposed arrangement with respect thereto. Moreover, also independently of said option, a design of this type of an air filter attachment also results in the option of achieving an air filter which is of smaller size at any rate in one dimension, with the same filter volume, that is to say the same quantity of filter material, through which flow can pass, which air filter can also additionally be fitted favorably into an overall design of the dynamic-type compressor, as a result of the external dimensions of said air filter.

A further possible achievement of the solution is given with regard to the filter part by virtue of the fact that the outline area of the filter part is elongate and is configured with curved outer edges in the direction of extent or is composed of a plurality of separate outline areas which are delimited in each case via a filter wall, the medium which is to be filtered flowing through the same outlet opening when flowing through each of the filter walls.

This is a filter part, as can preferably be used in an air filter attachment, more preferably according to one of the embodiments as described above. The filter part is also correspondingly formed so as to differ from a usual round design. However, this deviation can also be achieved by combining a plurality of individual filter elements, possibly individual filter elements of round outline, which are assigned, however, to the same outlet opening. The filter part can be configured so as to have an elongate outline in the use state and with curved outer edges in the direction of extent. The filter material of the filter part can be provided in pleated form overall; to be precise, preferably with pleated folds which extend perpendicularly with respect to a throughflow direction and/or perpendicularly with respect to an outline direction of extent of the air filter attachment. Other filter materials which are known for filter cartridges can also be used with regard to the filter material.

Further features of the invention are described or shown in the following text, also in the description of the figures and the drawing, often in their preferred assignment with respect to the concept which has already been described above; however, they can also be of significance in an allocation with respect to only one or more individual features which are described here or shown in the drawing, or independently or in another overall concept.

The height of the filter element is preferably formed so as to be constant in the direction of extent of the air filter attachment, into which the filter element is preferably to be inserted.

At least one of the outer edges of the filter element can run concavely.

Furthermore, it is preferred that, in the case of a plurality of combined filter elements with a plurality of outline areas, a filter wall is (also) composed of a pleated material; to be precise, further preferably, with regard to all said plurality of outline areas. In particular, for example, two filter elements which are formed with a substantially circular outline can be provided in pleated form, in each case one outlet preferably being provided on the bottom side in said outline areas, through which outlet the medium which is to be filtered flows out in the direction of the same outlet opening. The outlet opening can already be provided in the filter part itself. However, it can also be configured only in the air filter attachment, into which the filter part is to be inserted.

In a further preferred manner, the filter part has a sealingly closing filter ceiling on the top side. The filter ceiling is preferably seated directly on the filter material. It can be adhesively bonded or welded to the latter. In the case of a plurality of filter walls, that is to say a plurality of separate outline areas, the same filter ceiling preferably closes said plurality of outline areas sealingly on the top side.

The filter part can be capable of being screw-fastened in a receiving housing, that is to say, in particular, an air filter attachment, further preferably in one of the embodiments as described here. To this end, it can be further preferably provided that suitable shaped-out formations are provided on the filter ceiling. They can be formed, for example, in the form of eyelets which project beyond an outline of the filter ceiling at a plurality of points, for example at three or four points, and through which screws can be plugged or screwed. The mating threads can also be provided in the receiving housing, that is to say for instance in the air filter attachment.

The filter ceiling and/or the bottom part also preferably have/has an elongate outline; following this, an inner opening cross section of the housing, that is to say, in particular, of the air filter attachment, into which the filter part is to be received.

The filter ceiling and bottom part further preferably have coinciding outlines.

In particular, the concept of the invention can also be directed to a dynamic-type compressor, in particular a side channel compressor, with an air filter which is arranged thereon in one of the refinements as described here. Here, the air filter attachment can be arranged within the outer contour, in particular the outer contour of the housing of the compressor impeller, as viewed in a direction of the rotational axis of the compressor impeller. However, it can also be arranged only partially within said outer contour. Furthermore, it can also be provided that the air filter attachment is arranged completely within the outer contour with regard to an end of an end region, but then grows beyond the outer contour in the circumferential direction.

It is preferred that the enlarging dimension which was mentioned at the outset is present only toward one side, in particular starting from the inlet. In particular, a cross-sectional area of the housing inner space and/or the housing outer space can also have an oval or circularly annular design. Moreover, the design of the cross-sectional area or else of the housing overall, which design runs in a curved manner with regard to a geometric center axis of the cross section, is preferably also realized, in relation to a plan view.

A further feature relates to the fact that another opening or a connector is provided next to the air inlet in a plan view of the air filter attachment, which opening or connecter serves, for example, to secure or configure a safety valve. Said connector is correspondingly in an overlap with or laterally offset with respect to the filter material, through which flow initially does not pass or passes only to a much smaller extent. Should the air filter inlet become clogged during operation, the safety valve opens upon a corresponding vacuum, and the filter can thus also be flowed through immediately in a region which as a rule has not yet previously been flowed through substantially and therefore is not yet substantially clogged.

The inlet cross section of the inlet for air which is sucked through preferably corresponds to a customary standard cross section for an air filter attachment of a dynamic-type compressor, for which the air filter attachment is provided, that is to say, in particular, a side channel compressor. It is optionally different in accordance with the compressor power output of the dynamic-type compressor.

It is preferred with regard to the filter part that the elongate configuration of the outline has a very great dimension of extent which is greater than the height of the filter part. In particular, in what are known as cartridge filters, it is only known to form relatively high filter parts, in which the extent of the height, by which the inner cavity extends in a filter cartridge of this type starting from a bottom part, is greater than the greatest extent of the outline (in a plane or projected onto a plane).

It is also preferred that the filter height is substantially constant in the direction of extent of the base area which is also preferably planar. A further preferred embodiment relates to the measure that at least one outer edge of the outline runs concavely. The further outer edge is further preferably formed convexly with the same curvature.

Figure 2:
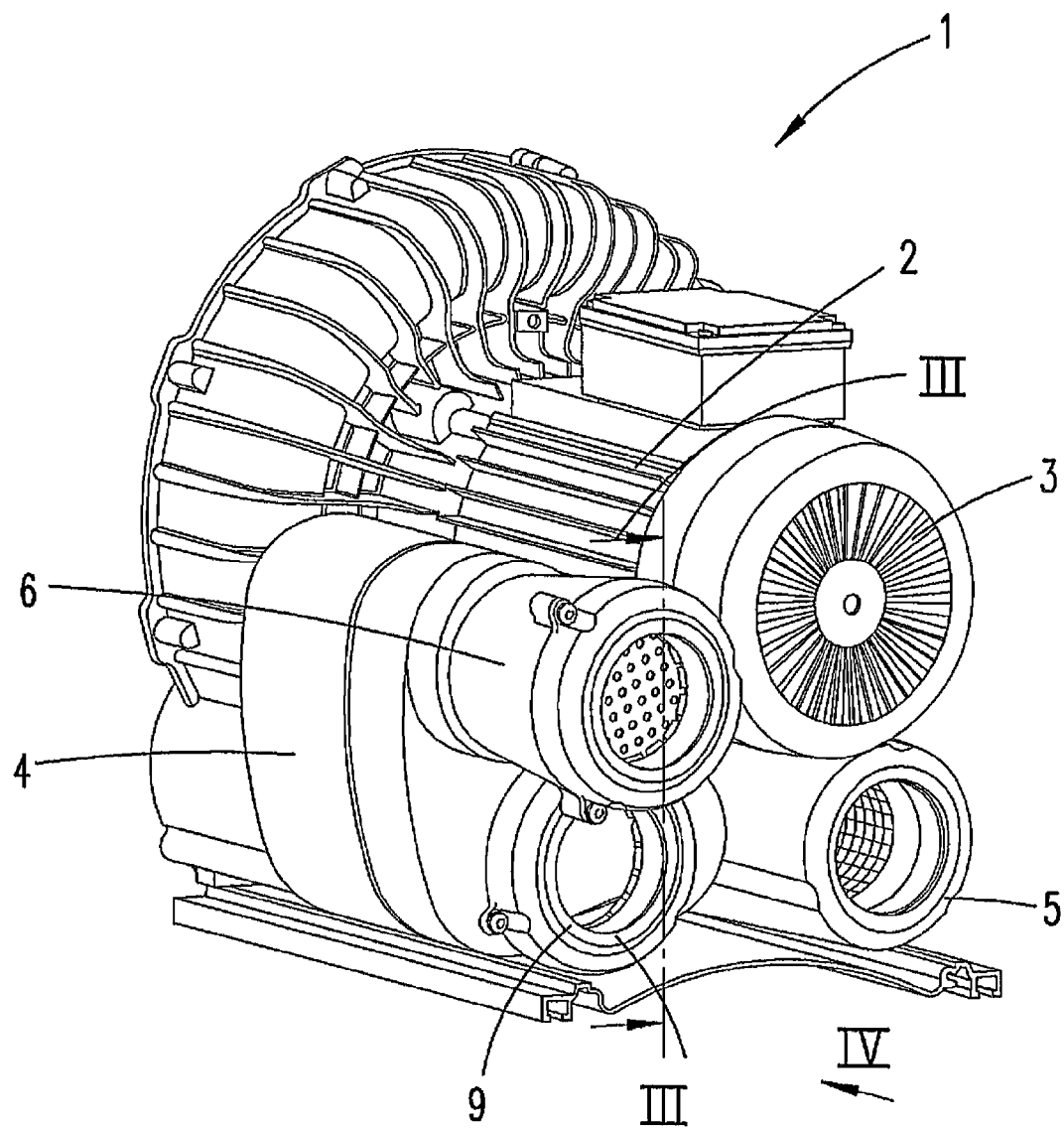
Figure 3:
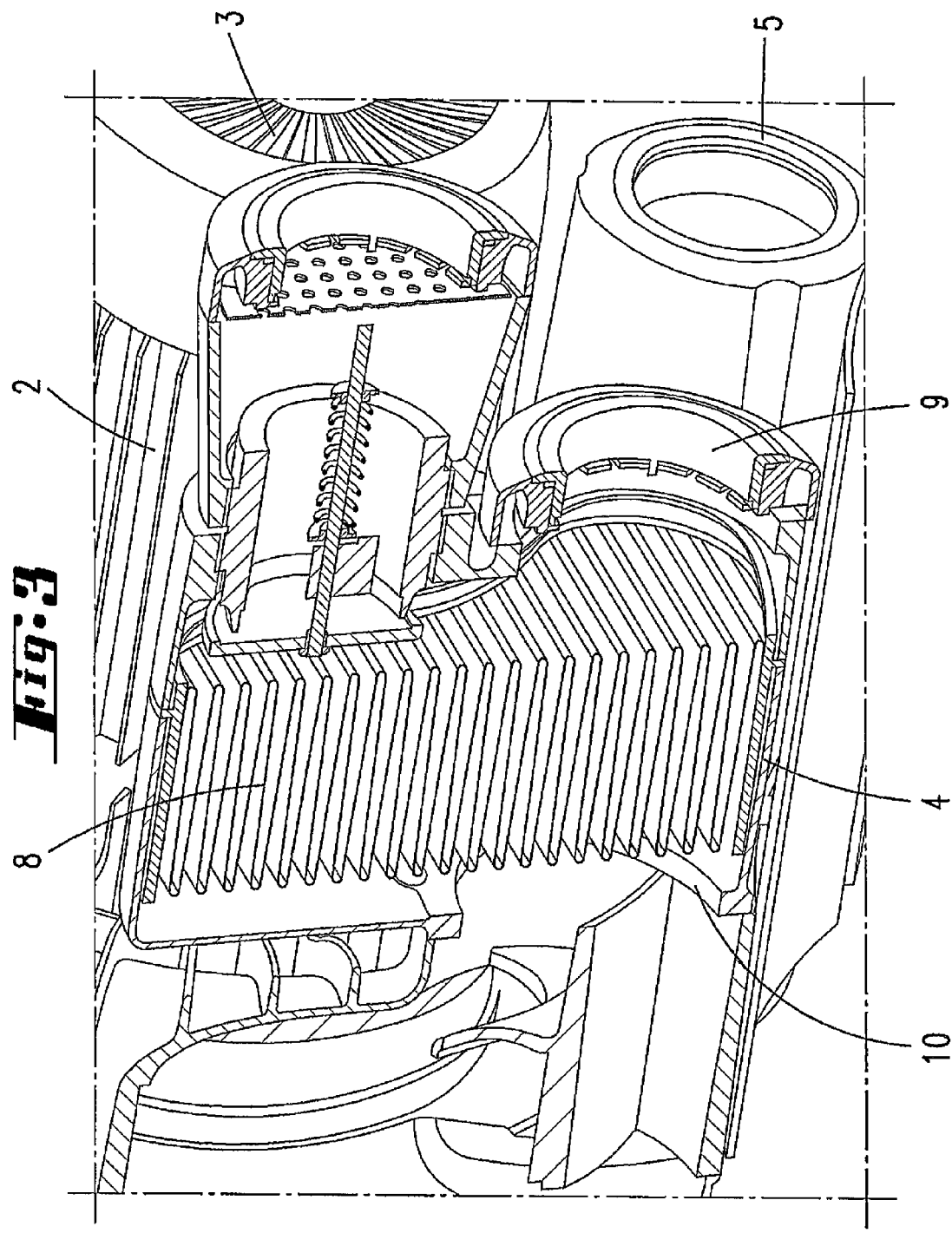
Figure 4:
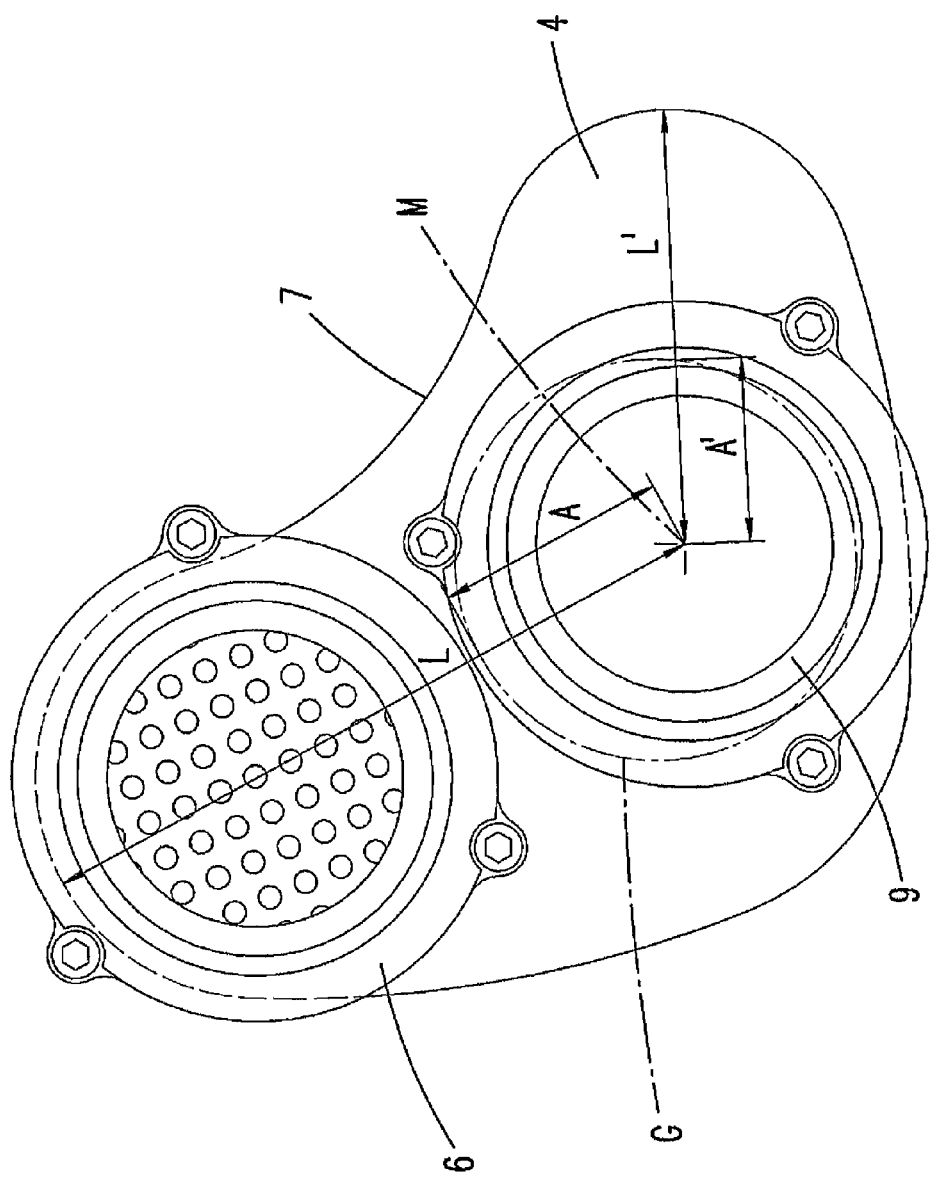
Figure 5:
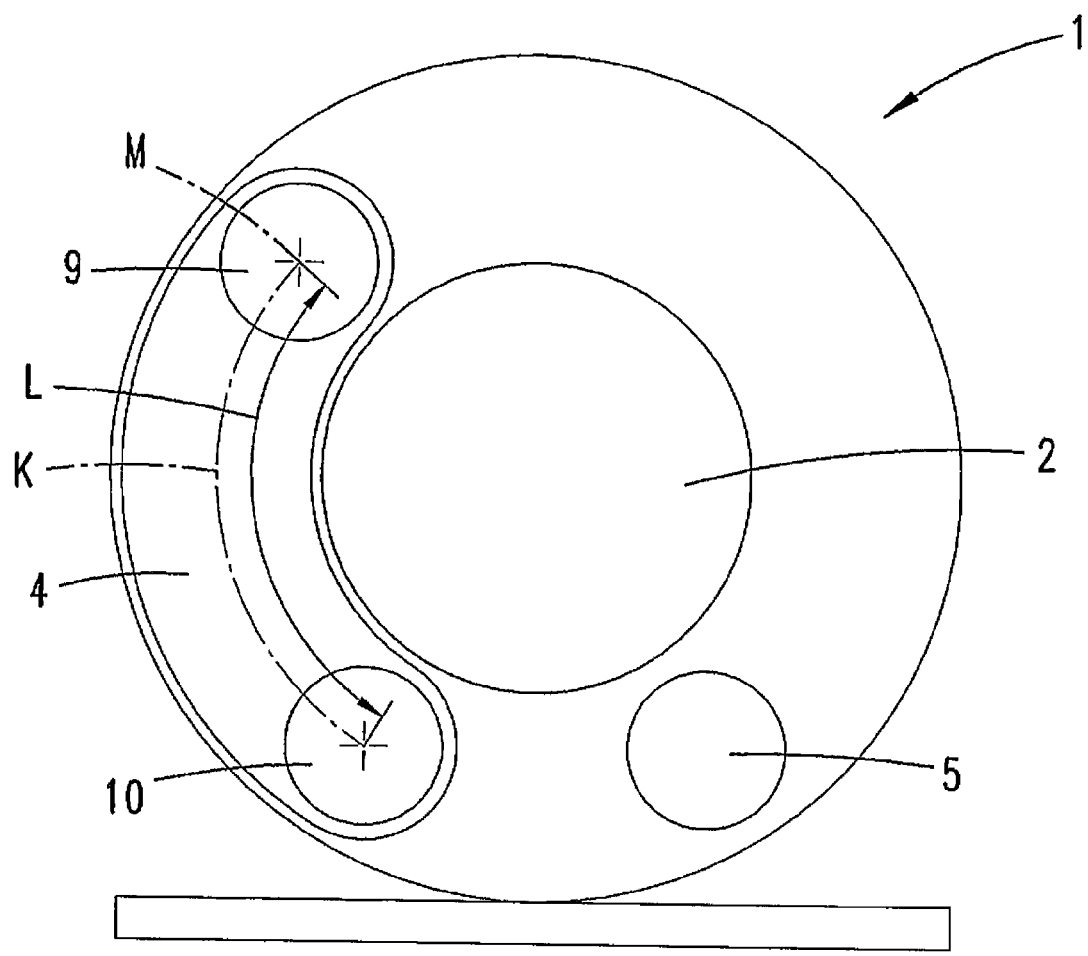
Figure 12:
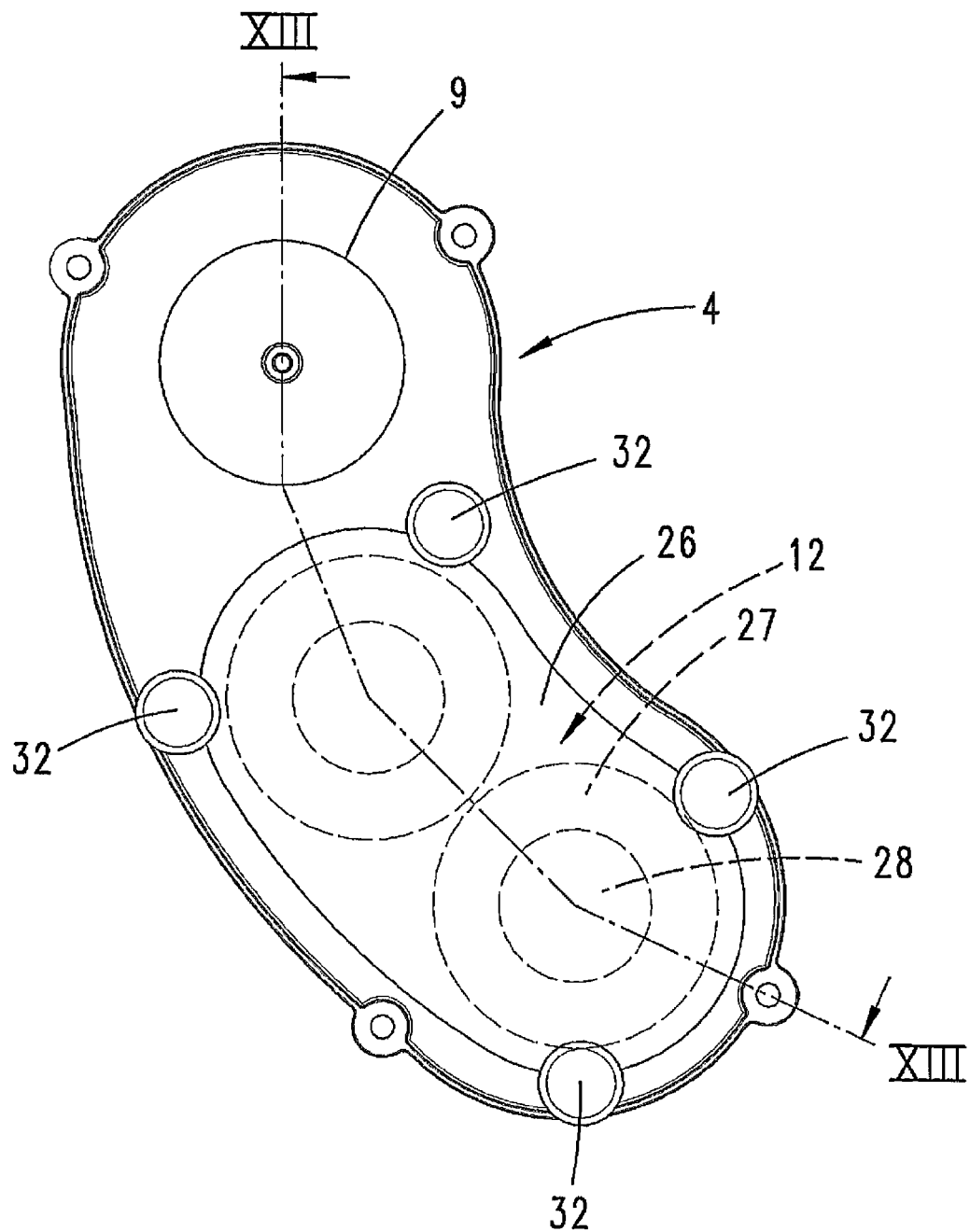
Figure 13:
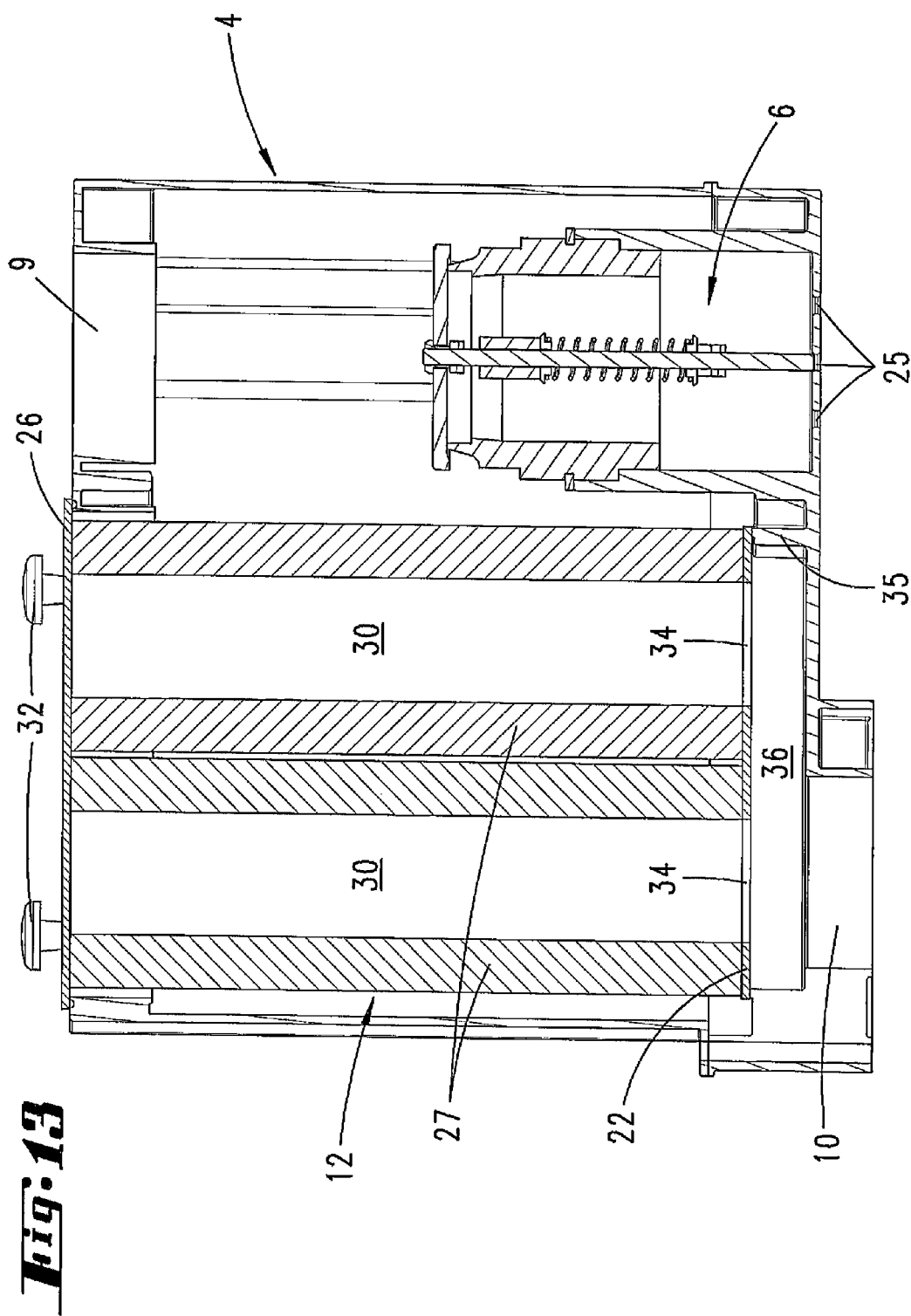
Figure 14:
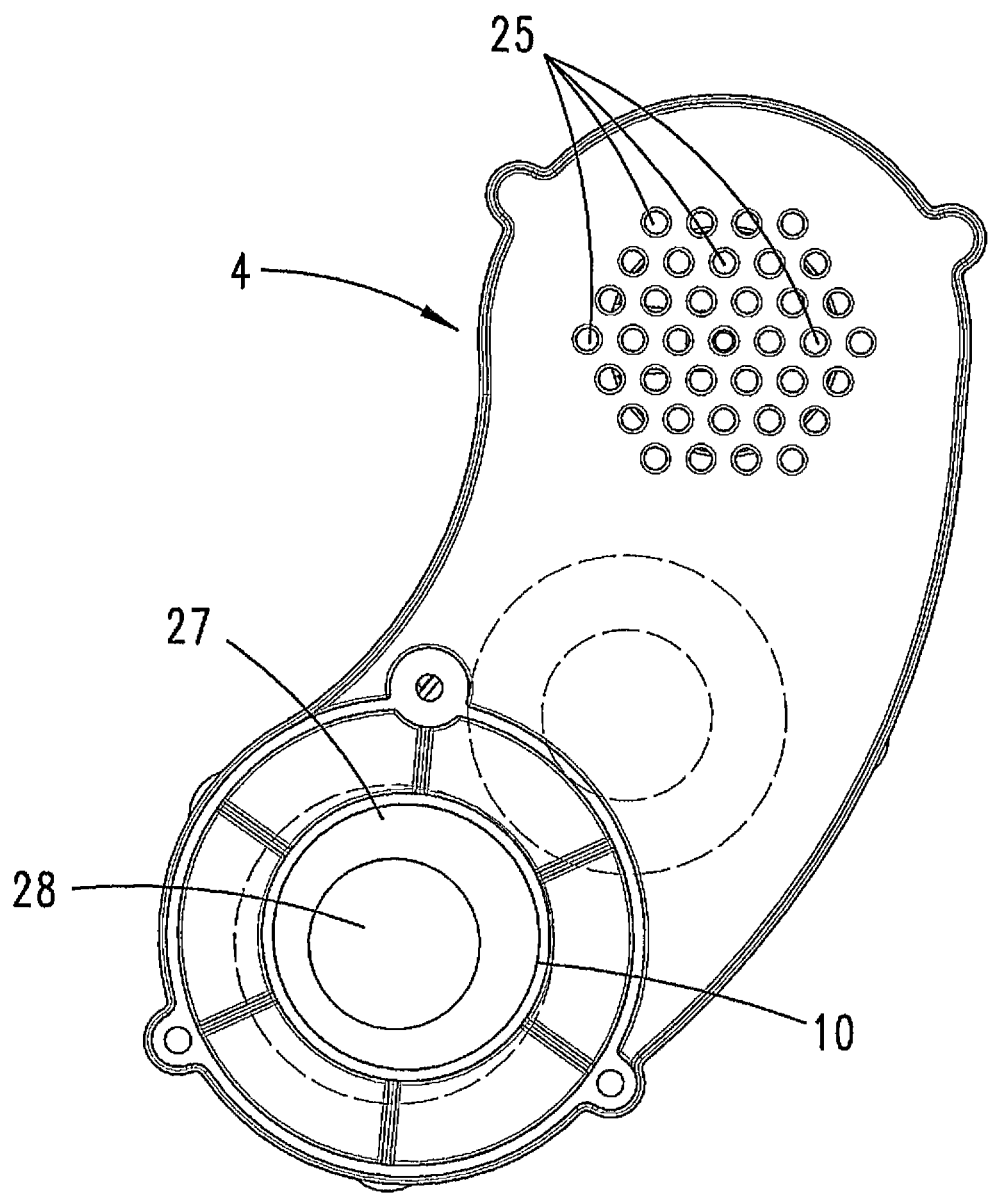
Figure 15:
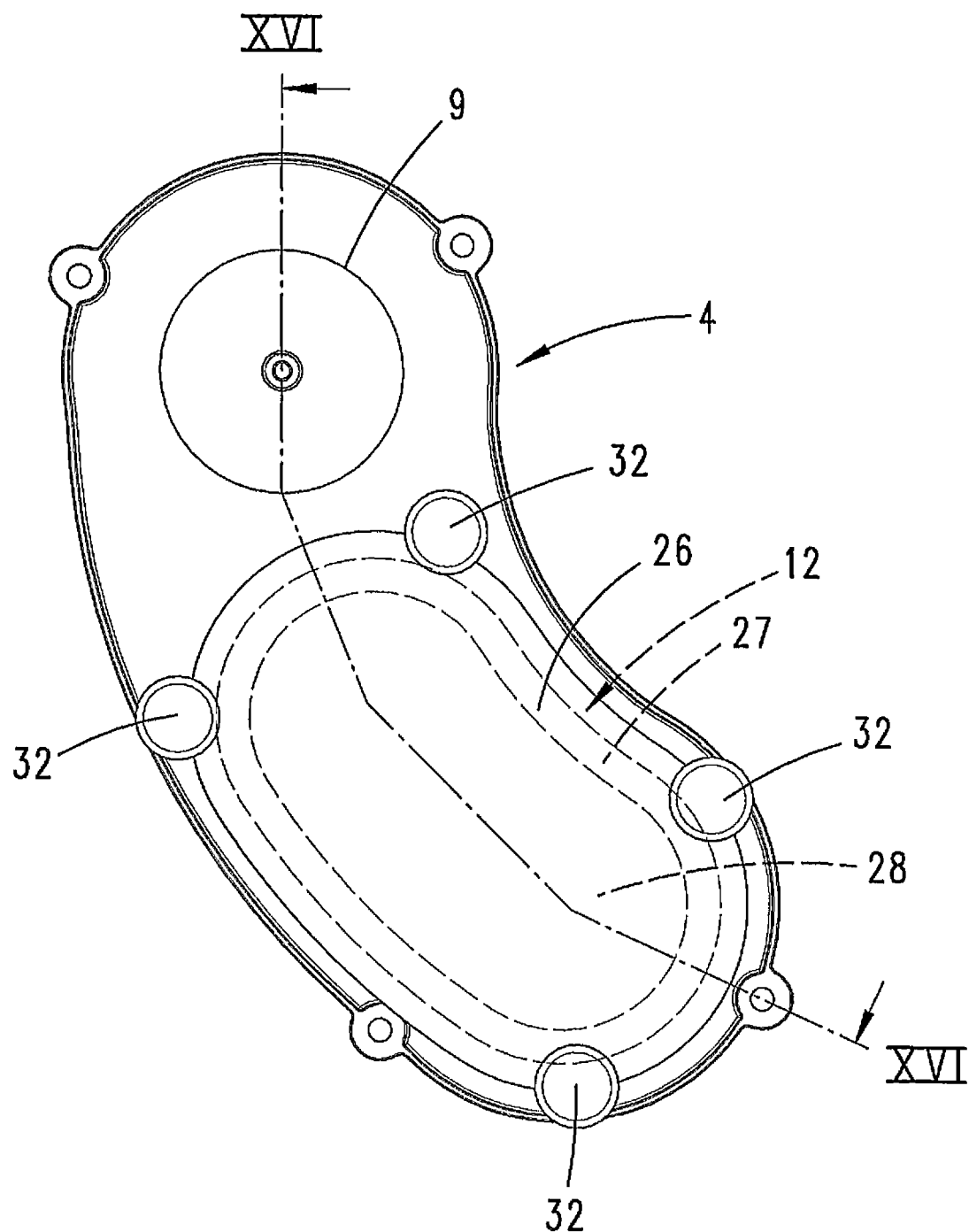
Figure 16:
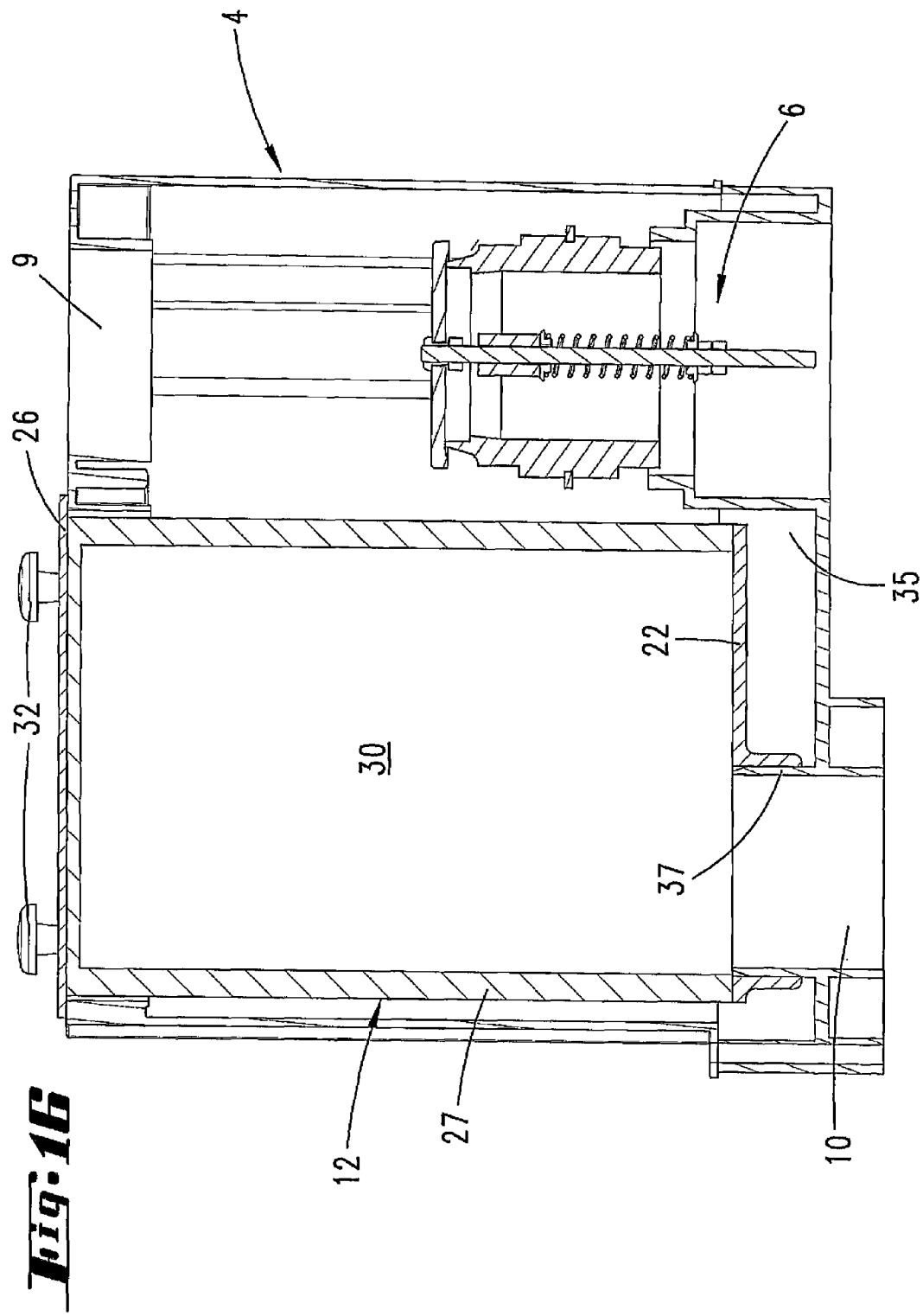
Figure 17:
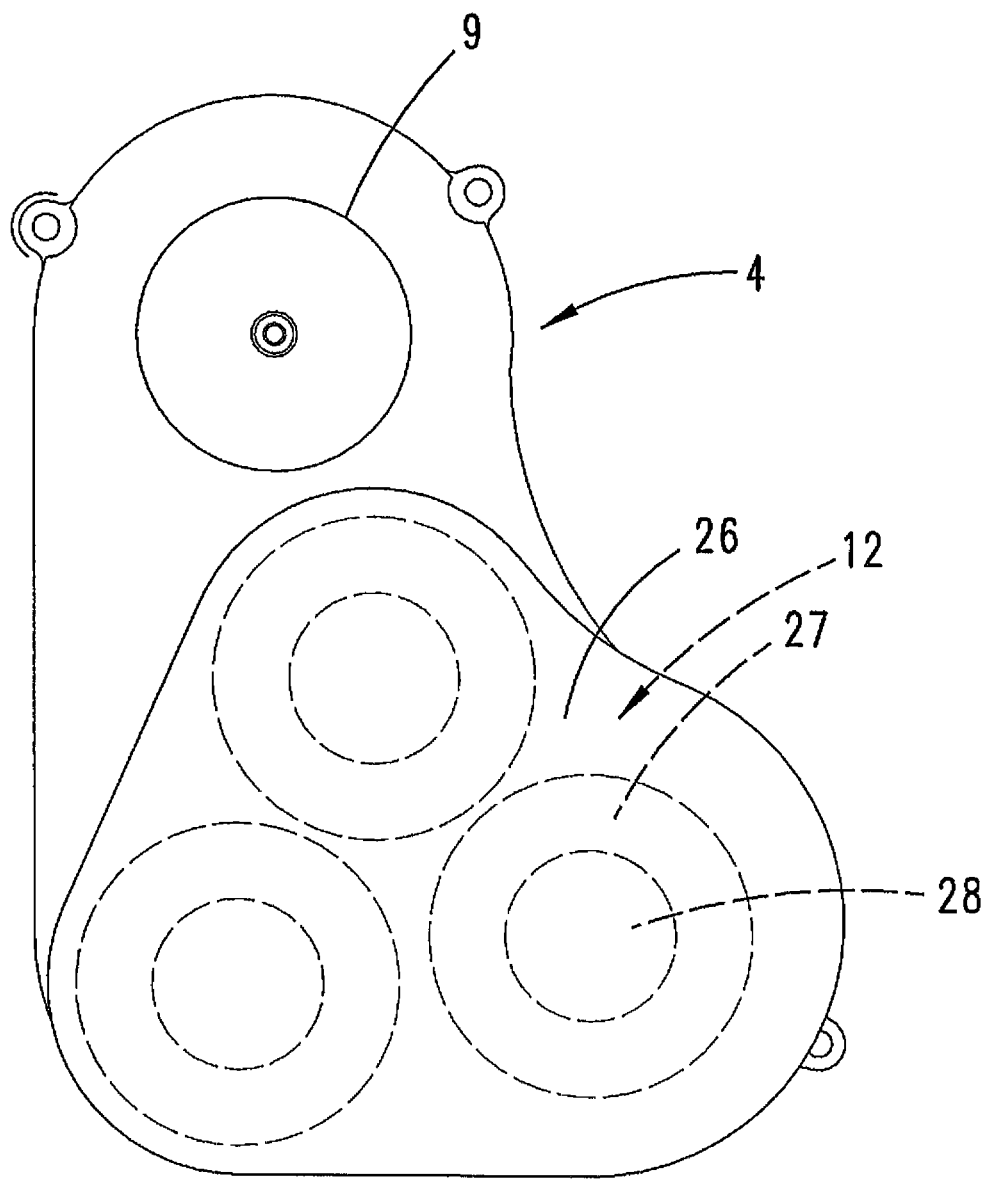

In the following text, the invention is explained, furthermore, using the appended drawing which, however, depicts merely exemplary embodiments of the invention. A part which is explained only in relation to one of the exemplary embodiments and is replaced by another part in a further exemplary embodiment, on account of the special feature which is produced there, said replacement not taking place precisely because of this reason, is therefore also described as a present part which is at any rate possible for said further exemplary embodiment. In the drawing:

FIG. 1 shows a perspective illustration of a side channel compressor having an air filter attachment, FIG. 2 shows an illustration according to FIG. 1, but having an additionally attached safety valve, FIG. 3 shows a cross section through the object according to FIG. 2, sectioned along the plane in FIG. 2, FIG. 4 shows a plan view of the filter housing according to FIG. 2, shown on its own, FIG. 5 shows a diagrammatic illustration of a side channel compressor, as viewed in the direction of the rotational axis of the fan and as viewed on the rear side, having a filter which is shaped like a circular annular segment and is arranged in the outer contour of the fan, FIG. 6 shows a perspective view of a pleated filter part having a non-round outline, FIG. 7 shows a plan view of a blank of filter material, as can be used to produce the object according to FIG. 6, in a state which is already partially pleated, FIG. 8 shows a plan view of the object according to FIG. 6, FIG. 9 shows an illustration according to FIG. 6 of a filter part configured in the manner of a filter cartridge, FIG. 10 shows an illustration of the filter part according to FIG. 9 in the installed state, diagrammatically, FIG. 11 shows an exploded illustration of a further filter part having a further air filter attachment, FIG. 12 shows the air filter attachment according to FIG. 11 in a plan view, FIG. 13 shows a cross section through the object according to FIG. 12, sectioned along the line XIII-XIII in FIG. 12, FIG. 14 shows a bottom view of the object according to FIG. 12, FIG. 15 shows a further embodiment in a view according to FIG. 12, FIG. 16 shows a cross section through the object according to FIG. 15, sectioned along the line XVI-XVI in FIG. 15, and FIG. 17 shows a plan view of a further embodiment in a view according to FIG. 12.

Initially with reference to FIG. 1, a side channel compressor 1 is shown and described having a flange-connected electric motor 2 which has a fan 3. Furthermore, an air filter attachment 4 is attached to the side channel compressor, and an air outlet attachment 5 which is configured as a sound protection device.

FIG. 2 shows a comparable side channel compressor, a safety valve 6 additionally being flange-connected to the air filter attachment 4, however. This is an emergency valve which opens automatically if the air inlet is clogged. The details can be seen from FIG. 3. For the possible installation of the safety valve 6 (see FIG. 1), the air filter attachment 4 preferably has a connecting flange 11.

The air filter attachment 4 is shown in plan view in FIG. 4. It can be seen that, in relation to the outer view which can be seen that it has a non-round outline 7. Overall, the design in this view is kidney-shaped.

Reduced by the respective wall thickness, the housing inner space is preferably designed so as to be equal to the outer contour.

A filter material 8 is seated in the housing inner space (cf. FIG. 3). As can be seen, this is filter material 8 which is pleated in a customary way.

An outlet 10 is configured on the air filter attachment 4 so as to lie opposite an inlet 9. The free cross sections of the inlet 9 and outlet 10 are arranged offset slightly with respect to one another in a perpendicular projection. Together, they form the overall cross section G.

A clearance, assigned to the inlet, is configured above the filter material 8, in concrete terms here above the plane which is formed by the pleated edges of the filter material 8 and delimited by the associated inner face of the housing, in which the air can first of all escape freely if the air which is flowing through seeks another path on account of certain clogging of the filter material in the initially selected air path. This clearance preferably extends above a projection area of the entire filter material (projection in the inlet direction of the air or in accordance with a central rotational axis of the fan).

In relation to FIG. 4 and the inlet opening cross section which can be seen there, a center axis M can be specified with regard to the opening cross section which can be seen there. Starting from here, with regard to the overall cross section G which is illustrated using dash-dotted line in FIG. 4, a dimension A can be plotted in the first enlarging direction here of the housing from the center axis M as far as the edge of the overall cross section G. An overall dimension L, given in said enlarging direction, of the housing inner space corresponds in the exemplary embodiment to from 2 times to 3 times the dimension A, in concrete terms approximately 2.5 times. A ratio of 1.5:5 is preferred.

Corresponding ratios A' to L' result in the second enlarging direction which is given here.

The enlarging can also exist only on one side.

With regard to the disclosure, the regions which are specified in the preceding and following text also include all intermediate values, in particular in 1/10 steps, that is to say, for example, a ratio of 1.6:5 or 1.5:4.9, etc., firstly in order to restrict the stated range limits at the bottom and/or top, but also as an alternative or in addition with regard to the disclosure of one or more singular values from the respectively specified range.

An air filter attachment 4 which is formed overall in the shape of a circular annular segment is provided in the embodiment of FIG. 5. This is a diagrammatic illustration. The inlet 9 and the (opposite) outlet 10 or inlet into the fan can be seen.

Starting from the center axis M of the opening cross section which can be seen there, a dimension A can be plotted from the center axis M as far as the edge of said opening cross section. Here, in view of the geometric outline design in the form of a circular annular segment, the dimension A is plotted on a center circle line K. The enlarging direction of the housing is given in the direction of the outlet 10. An overall length L which is given in said enlarging direction, also to this extent plotted on the circular arc line K, corresponds in the exemplary embodiment to from 5 times to 10 times, in concrete terms approximately 7 times, the dimension A. This range is also of significance for the initially described exemplary embodiment.

FIGS. 6 to 10 relate to filter parts, as can be used, in particular, in a filter attachment according to the above description.

In relation to FIG. 6, a filter part 12 is shown which is composed of a pleated filter material 8 and has an outline area 13 which is elongate, namely has a greater length l than width b. Here, the width b addresses the width of the filter part in a region over the longitudinal extent, not the width B which is as large as possible and is given without consideration of the curvature.

In the direction of extent, as is given in the direction of the length dimension l in the exemplary embodiment, the filter part clearly runs with curved outer edges 14, 15 which, in the exemplary embodiment, merge into one another via end-side outer edges 16, 17 which are curved in a more pronounced manner (cf. also FIG. 8). The outer edges with regard to the embodiment of FIGS. 6 and 7, that is to say of the filter part which is formed continuously from pleated filter material, are the outer edges here which result from the respective width extent of the filter material 8 added together. Accordingly, they partially do not coincide over the length with an actual real edge.

The filter material 8 according to FIG. 7 is, for example, a nonwoven material which represents the starting state in this blank (left-hand region of the illustration) or has already been pleated (right-hand region of the illustration). Folding is carried out overall in accordance with the illustration in FIG. 6, which then results in the final shape of the filter part according to FIG. 6. FIG. 8 shows the outline of the filter part according to FIG. 6, but it can also be the outline of the filter part according to FIGS. 9 and 10.

The illustration according to FIG. 8 is a circular annular section, with the stated rounded end sides. A preferably geometrically homogeneous part is shown here which correspondingly also has a center circle line K, as has already been explained with respect to FIG. 5.

An extent of curvature E of a concave outer edge 14 is preferably in comparison with a given as a tangent T to the regions of said outer edge 14 which project inward furthest in this regard, and corresponds to a twentieth or more of the length l' between the contact points of the tangent T on the outer edge 14. In the case of a convex outer edge, as given here with regard to the outer edge 15, a tangent T' to the outer edge 15 is to be assumed, parallel to the tangent T. At the contact point of the tangent T' with the outer edge 15, the extent E' can be measured as far as the center circle line K, which extent E' in the same way preferably corresponds to a twentieth or more of the length l'; in both cases, up to approximately half of the length l'.

With regard to the filter part 19 according to FIGS. 9 and 10, it is of significance that, beyond the stated elongate design with curved outer edges, it has a circumferential filter wall 21 which delimits an inner clearance 20, and a continuous bottom part 22. Air flows in offset with respect to an (area) center point of the outline of said filter part 21, in accordance approximately with the arrow P in FIG. 9, it also being possible here for reference to be made to the real conditions for the air inlet as described in a filter attachment of the above description; the result is that this has to exit through the wall 21, in order to pass into the air outlet by flowing around the bottom part 22. To this end, the bottom part 21 can be seated on, for example, stepped sections 23 in the installed state, which stepped sections 23 make corresponding circulation possible.

If the initially shortest region of the wall regions W for the air flow with regard to, for example, the shown in a dashed manner in FIG. 9 is clogged, adjoining wall regions can be sought by the air flow for penetration, therefore results clearly also in the case of a filter part 19. Continuous clogging of the walls can also thus be achieved afterward with a correspondingly offset inlet and outlet flow.

FIG. 11 shows a further air filter attachment 4 which, as can be seen, has an outline design in the shape of a circular arc segment, with rounded narrow sides. The outline design relates to an extent of the air filter attachment in the mounted state in the circumferential direction of a rotor of the compressor.

On the top side, said air filter attachment 4 has an inlet 9 on one side and an insertion opening 24 on the other side. The insertion opening 24 serves to insert the filter part 12. As can be seen, the filter part 12 is adapted in its overall outline to the opening area of the insertion openings 24.

On the bottom side (cf. also FIGS. 13 and 14), the air filter attachment 4 has an outlet 10 and preferably inlet openings 25 in relation to a safety valve 6. The safety valve 6 is therefore preferably arranged in a quasi-opposed manner to the inlet 9, in relation to an inflow direction on the inlet 9. The safety valve 6 is integrated overall into the air filter attachment. It protrudes into the interior of the air filter attachment 4.

The filter part 12 of said embodiment has a filter ceiling 26 and a bottom part 22. Two separate filter walls 27 which, as can be seen in the exemplary embodiment, are formed from pleated material extend between the bottom part 22 and the filter ceiling 26. As can be seen, furthermore, the pleated edges preferably run in the perpendicular here, that is to say extending perpendicularly with respect to the filter ceiling 26 and the bottom part 22. They therefore also extend perpendicularly with respect to an outline area of the filter part or the air filter attachment 4.

As can be seen, for example, from FIG. 12, furthermore, the filter walls 27 in each case delimit a dedicated, separate outline area 28. In the exemplary embodiment of FIG. 12, two outline areas 28 are provided in juxtaposition. They are surrounded in each case completely circumferentially by filter material 27. As can be seen, a separate outline area 28 of this type is preferably circular or substantially circular (in relation to the pleated course of the filter material in the exemplary embodiment).

However, the filter part 12 overall has an outline which, as has already been addressed, is elongate and curved in the shape of a circular segment, adapted to a cross-sectional contour of the inner space 29 of the air filter attachment 4.

Medium which is to be filtered, that is to say, in particular, air, flows through the inlet 9 into the air filter attachment 4 and then through the outlet 10 into the dynamic-type compressor. Downstream of the inlet 9, the medium which is to be filtered flows through one or both of the filter walls 27 into the inner clearance 30 (cf. also FIG. 13) which is enclosed by a wall of this type. As then also results, in particular, from FIG. 30, furthermore, the medium which is to be filtered flows from one or both clearances 30 then in each case through the same outlet 10, that is to say optionally into the connected dynamic-type compressor.

Should one of the filter walls 27 become clogged excessively, more medium which is to be filtered can correspondingly flow through the other filter wall 27. An advantageous compensating option is produced.

As can be seen, furthermore, the filter ceiling 26 has ear-like shaped-out formations 31, through which fastening screws 32 can protrude into threaded openings 33 of the air filter attachment housing, in order to fasten the filter part 12 in the air filter attachment 4.

In a further detail, the bottom part 22 of the filter part 12 has an assigned bottom opening 34 with respect to each clearance 30, whereas a receiving shaped-out formation 35 is formed in the air filter attachment, also on the bottom side, on which receiving shaped-out formation 35 the bottom part 22 is seated on the edge side in the installed state. It is sealed there. At the same time, a flow duct 36 is formed as a result in the air filter attachment below the bottom part 22 and in interaction with the latter, which flow duct 36 guides the air which flows through overall to the outlet 10 which is preferably arranged on one side with regard thereto.

In the embodiment of FIG. 15, the filter part 12 consists of a uniform circumferential filter wall 27 which is not of circular formation, however. Here, said filter wall 27 has an identical outline, as the filter part 12 according to FIG. 11 has overall, regardless of the gussets as a result of the two filter walls 27 there. Accordingly, only one uniform inner clearance 30 also results in the cross-sectional illustration of FIG. 16. A flow duct 36 is not provided there, but rather only the outlet 10 is configured, also arranged offset with respect to a center axis of the clearance 30 here. The outlet 10 has a collar 37, to which the bottom part 22 is plug-connected.

FIG. 17 shows an embodiment, in which, in an analogous refinement to the embodiment of FIG. 11, three separate filter walls are formed, also with a respectively circular separate outline here. Otherwise, identical conditions result as described with respect to the embodiment of FIG. 11.

All the disclosed features are essential (per se) for the invention. The complete content of disclosure of the associated/appended priority documents (copy of the prior application) is hereby also incorporated into the disclosure of the application, also for the purpose of including features of said documents into claims of the present application. In their optionally further independent version, the subclaims characterize independent inventive developments of the prior art, in particular in order to perform divisional applications on the basis of said claims.

LIST OF DESIGNATIONS

1 Side channel compressor
2 Electric motor
3 Fan
4 Air filter attachment
5 Air outlet
6 Safety valve
7 Outline
8 Filter material
9 Inlet
10 Outlet
11 Connecting flange
12 Filter part
13 Outline area
14 Outer edge
15 Outer edge
16 Outer edge
17 Outer edge
18 Outer edge
19 Filter part
20 Clearance
21 Filter wall
22 Bottom part
23 Step
24 Insertion opening
25 Passage openings
26 Filter ceiling
27 Filter wall
28 Outline area
29 Inner space
30 Clearance
31 Shaped-out formation
32 Fastening screw
33 Threaded opening
34 Bottom opening
35 Receiving shaped-out formation
36 Flow duct
37 Plug-in collar
M Center axis
A Dimension
C Overall cross section
L Overall length
K Center circle line
l Length
b Width
B Width
V Offset dimension
W Wall regions
E Extent of curvature

The invention claimed is:
1. An air filter attachment for a dynamic-type compressor, the air filter attachment comprising:
a housing having a housing inner space, an inlet, and an outlet and
a filter part comprising a filter material, a filter ceiling, a bottom part, a first wall arranged between the bottom part and the filter ceiling, and a second wall separate from the first wall and arranged between the bottom part and the filter ceiling, the filter part being arranged in the housing inner space,
wherein the inlet and the outlet each has a respective free opening cross section for air which is sucked through,
wherein the housing has a kidney-shaped design in plan view,
wherein the inlet of the housing has a center axis,
wherein the housing inner space extends laterally with respect to the free opening cross section of the inlet in an inhomogeneous manner and in a first direction by an enlarging dimension, the enlarging dimension corresponding to 1½ or more of a dimension from the center axis of the inlet as far as a boundary of the free opening cross section of the inlet in said first direction,
wherein the housing inner space of the housing has a cross-sectional contour,
wherein the filter part has, overall, an elongate outline curved in a circular-segment shape, adapted to the cross-sectional contour of the housing inner space,
wherein a medium to be filtered flows into the air filter attachment through the inlet and flows out through the outlet,
wherein the first wall of the filter part encloses a first inner clearance, wherein the second wall of the filter part encloses a second inner clearance, wherein the medium flows downstream of the inlet, through one or both of the first filter wall and the second filter wall into one or both of the first inner clearance and the second inner clearance, respectively, and then flows out of one or both of the first inner clearance and the second inner clearance through the outlet, wherein the bottom part of the filter part has an edge side, has a first bottom opening assigned to the first inner clearance, and has a second bottom opening assigned to the second inner clearance, wherein a receiving shaped-out formation is formed in the housing of the air filter attachment on a bottom side of the housing of the air filter attachment, wherein in the installed state the edge side of the bottom part of the filter part is seated on the receiving shaped-out formation of the housing and is sealed on the receiving shaped-out formation, and wherein a flow duct is formed in interaction with the bottom part and guides the air flowing through overall to the outlet.

2. The air filter attachment according to claim 1, wherein the filter material is a nonwoven material.

3. A side channel compressor comprising:
an air filter attachment comprising an air filter attachment housing and a filter material, the air filter attachment housing comprising a housing inner space, an inlet, and an outlet, the filter material being arranged in the housing inner space, and
a compressor fan comprising a fan outer contour, a compressor fan housing, and a rotational axis, the fan outer contour comprising a projection,
wherein, in plan view, the air filter attachment housing is arranged at least partially within an outer contour of the side channel compressor, in relation to the projection of the fan outer contour in a direction of the rotational axis of the compressor fan, and
wherein an outer contour of the air filter attachment housing has a non-circular, kidney-shaped design in said plan view.

4. The side channel compressor according to claim 3, wherein the filter material is a nonwoven material.

5. A filter part for use in an air filter, the filter part comprising:
a filter bottom part having a first bottom opening, having a second bottom opening, and having a bottom part elongate outline,
a filter ceiling having a ceiling elongate outline,
a first filter element comprising a first filter element filter wall, a first filter element bottom side, first filter element outline areas, a first filter element inner clearance, and a first filter element outlet, the first filter element filter wall being made from pleated filter material and extending between the filter bottom part and the filter ceiling,
a second filter element comprising a second filter element filter wall, a second filter element bottom side, second filter element outline areas, a second filter element second inner clearance, and a second filter element outlet, the second filter element filter wall being made from pleated filter material and extending between the filter bottom part and the filter ceiling,
wherein an outline of the filter part is curved in an elongate manner in a circular-segment shape and is configured with curved outer edges in a direction of extent,
wherein the first filter element and the second filter element are provided in a combined manner,
wherein the first filter element outlet is provided on the first filter element bottom side in the first filter element outline areas,
wherein the second filter element outlet is provided on the second filter element bottom side in the second filter element outline areas,
wherein the filter ceiling seals the filter part on a top side of the filter part, the filter ceiling being seated directly on the filter material,
wherein the first bottom opening of the bottom part is assigned to the first filter element inner clearance,
wherein the second bottom opening of the bottom part is assigned to the second filter element inner clearance,
wherein the ceiling elongate outline and the bottom part elongate outline coincide, and
wherein shaped-out formations suitable for screw fastening are provided on the filter ceiling.

* * * * *